United States Patent
Roissard et al.

(10) Patent No.: US 10,721,585 B2
(45) Date of Patent: Jul. 21, 2020

(54) METHOD OF GENERATING A GEOREFERENCED PLAN OF A BUILDING COMPLEX BASED ON TRANSFORMATION BETWEEN CARTESIAN PROJECTION SPACES

(71) Applicant: VISIOGLOBE, Montbonnot Saint Martin (FR)

(72) Inventors: Ulrich Roissard, Curienne (FR); Philippe Poutignat, Lumbin (FR)

(73) Assignee: VISIOGLOBE, Montbonnot Saint Martin (FR)

( * ) Notice: Subject to any disclaimer, the term of this patent is extended or adjusted under 35 U.S.C. 154(b) by 235 days.

(21) Appl. No.: 16/075,609

(22) PCT Filed: Feb. 10, 2016

(86) PCT No.: PCT/IB2016/000252
§ 371 (c)(1),
(2) Date: Aug. 4, 2018

(87) PCT Pub. No.: WO2017/137787
PCT Pub. Date: Aug. 17, 2017

(65) Prior Publication Data
US 2019/0045323 A1     Feb. 7, 2019

(51) Int. Cl.
*H04W 4/021* (2018.01)
*G01C 21/20* (2006.01)
(Continued)

(52) U.S. Cl.
CPC .......... *H04W 4/021* (2013.01); *G01C 21/206* (2013.01); *G06T 3/00* (2013.01); *G06T 3/005* (2013.01); *G06T 11/60* (2013.01); *H04W 4/024* (2018.02)

(58) Field of Classification Search
CPC ........ H04W 4/021; H04W 4/024; G06T 3/00; G06T 3/005; G06T 11/60; G01C 21/206
See application file for complete search history.

(56) References Cited

U.S. PATENT DOCUMENTS

| 8,675,013 B1 | 3/2014 | Romaszewicz et al. |
| 2008/0192053 A1 | 8/2008 | Howell et al. |

(Continued)

OTHER PUBLICATIONS

C. Stahl et al., "Taking Location Modelling to New Levels: A Map Modelling Toolkit for Intelligent Environments," LoCA 2006 Lecture Notes in Computer Science, Jan. 1, 2006, pp. 74-85.

(Continued)

*Primary Examiner* — Maurice L. McDowell, Jr.
(74) *Attorney, Agent, or Firm* — Moreno IP Law LLC

(57) ABSTRACT

The invention concerns a method of generating a georeferenced plan of a building or building complex, the method involving: providing a georeferenced reference image of a map or aerial view of an area (101) comprising the building or building complex (102) in a first Cartesian projection space; converting, by a processing device, first coordinates of three or more points defining a zone selection window (404) in the reference image into three or more corresponding geodetic coordinates; converting, by the processing device, the three or more geodetic coordinates into second coordinates of the three or more points in a second Cartesian projection space to define a final zone in the second Cartesian projection space; and generating the georeferenced plan by transforming, by the processing device, the image zone of the reference image delimited by the zone selection window (404) to fill the final zone in the second Cartesian projection space.

11 Claims, 5 Drawing Sheets

(51) Int. Cl.
*G06T 3/00* (2006.01)
*H04W 4/024* (2018.01)
*G06T 11/60* (2006.01)

(56) References Cited

U.S. PATENT DOCUMENTS

2010/0023252 A1 1/2010 Mays et al.
2014/0132640 A1 5/2014 Sharma et al.

OTHER PUBLICATIONS

International Search Report for International Application No. PCT/IB2016/000252, dated Oct. 27, 2016, 3 pages.

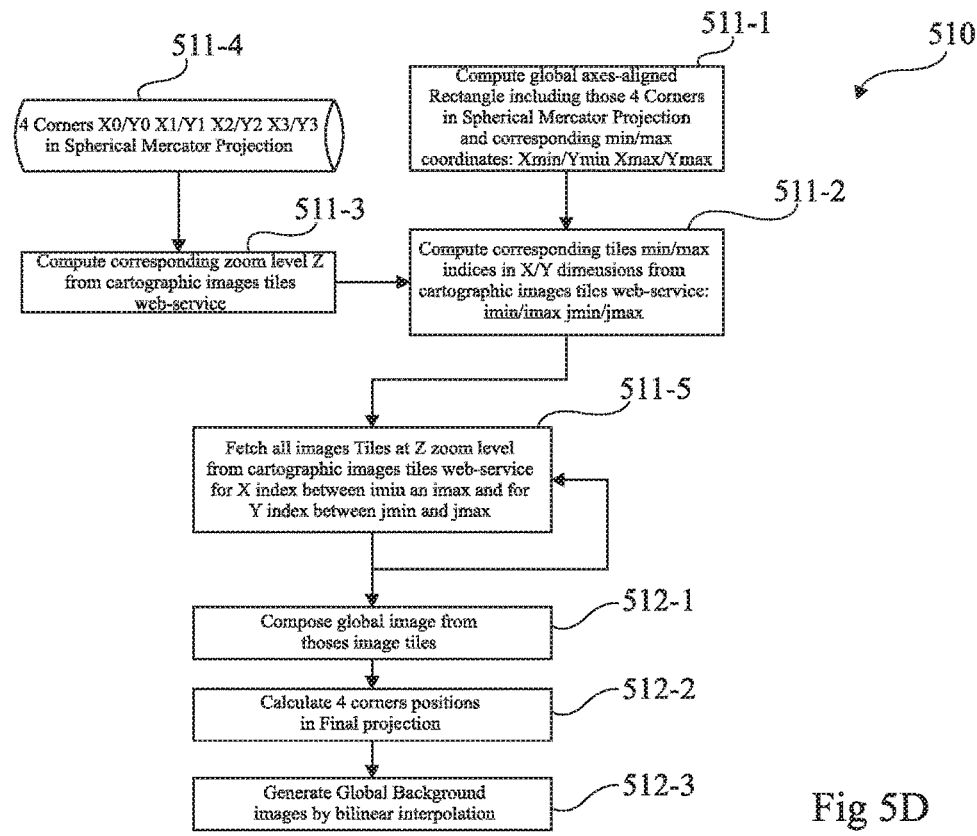
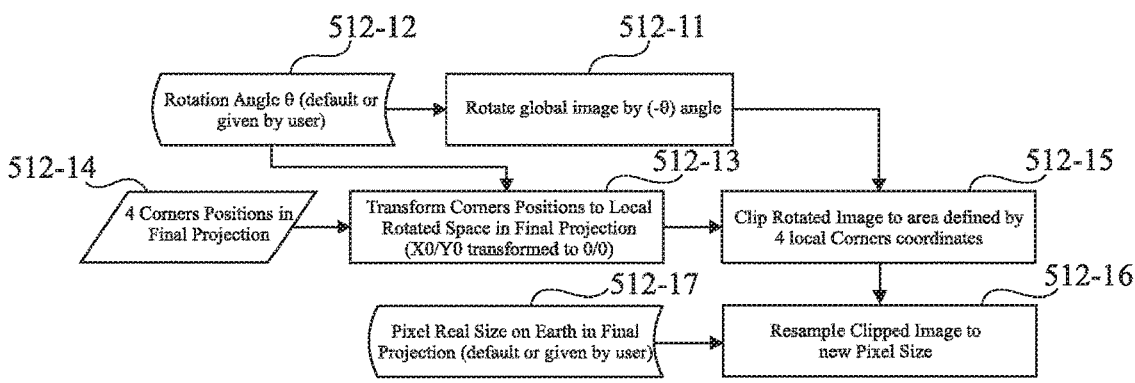
Fig 5D
Fig 5E
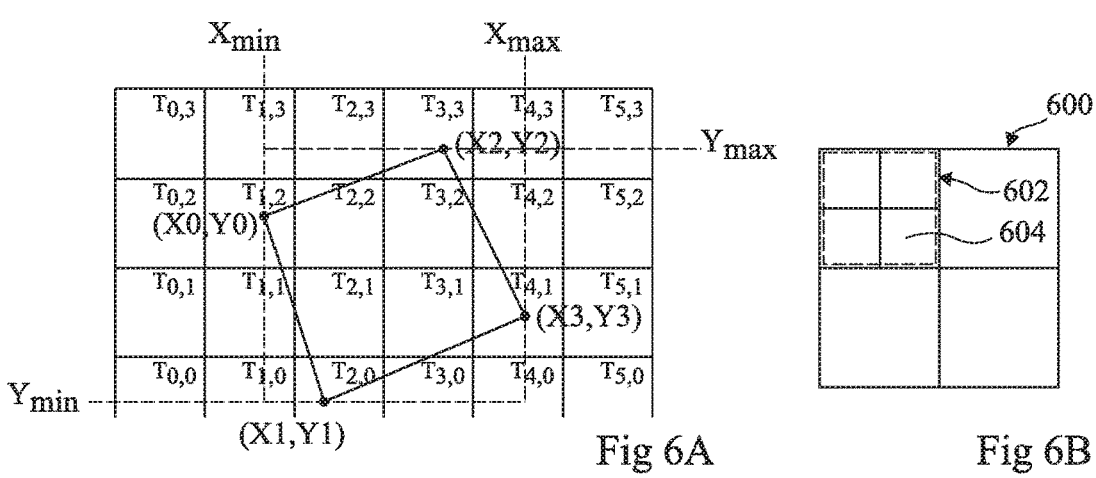
Fig 6A
Fig 6B

METHOD OF GENERATING A GEOREFERENCED PLAN OF A BUILDING COMPLEX BASED ON TRANSFORMATION BETWEEN CARTESIAN PROJECTION SPACES

FIELD

The present disclosure relates to the field of cartography and georeferencing, and in particular to a method and device for generating a georeferenced plan of a building or building complex.

BACKGROUND

Street navigation has been significantly aided in recent years by advances in communication technology. Indeed, mobile telephones or smart phones now generally include a satellite navigation application capable of displaying to a user a view of a map and/or satellite image of a desired location. Such mobile devices generally comprise a positioning system such as a GPS (Global Positioning System) that can indicate a relatively precise location of the user on the map/satellite image, track the movements of the mobile device on the map/satellite image, and even guide the user to a desired destination.

While such navigational aids provide a generally adequate service for the purpose of street navigation, they are generally unhelpful for navigation within buildings or building complexes, such as shopping complexes, airports, hospitals, etc. Indeed, to be able to locate and/or guide a user through such building structures, a detailed 2-dimensional or 3-dimensional plan of the building structure is generally needed, and the precise location of points on this plan should be available so that the user's position can be plotted on such a plan. While plans, such as architect drawings, of building complexes are often available or can be created, there is a technical problem in accurately georeferencing points of these plans in simple manner.

SUMMARY

It is an aim of embodiments of the present description to at least partially address one or more problems in the prior art.

According to one aspect, there is provided a method of generating a georeferenced plan of a building or building complex, the method comprising: providing a georeferenced reference image of a map or aerial view of an area comprising the building or building complex, the reference image corresponding to a first Cartesian projection space; converting, by a processing device, first coordinates of three or more points defining a zone selection window in the reference image into three or more corresponding geodetic coordinates; converting, by the processing device, the three or more geodetic coordinates into second coordinates of the three or more points in a second Cartesian projection space to define a final zone in the second Cartesian projection space; and generating the georeferenced plan by transforming, by the processing device, the image zone of the reference image delimited by the zone selection window to fill the final zone in the second Cartesian projection space.

According to one embodiment, the method further comprises generating a further georeferenced plan by combining with or replacing some or part of said final zone in the second Cartesian projection space with a plan of said building or building complex.

According to one embodiment, the method further comprises, prior to converting the first coordinates, displaying by the processing device an initial zone selection window superimposed over the reference image, and receiving a user input defining a modification to one or more of the size and angle of rotation of the initial zone selection window in order to generate said zone selection window.

According to one embodiment, displaying the initial zone selection window comprises: defining coordinates of three or more initial points in the second Cartesian projection space defining the final zone; converting, by the processing device, the three or more initial points into three or more initial geodetic coordinates; and converting, by the processing device, the three or more initial geodetic coordinates to define three or more initial points delimiting the initial zone selection window in the first Cartesian projection space.

According to one embodiment, the method further comprises: receiving, via an input interface of the processing device, a modification of one or more of the size and angle of rotation of the initial zone selection window; calculating, based on said modification, three or more modified points in the second Cartesian projection space defining a modified final zone; converting, by the processing device, the three or more modified points into three or more modified geodetic coordinates; converting, by the processing device, the three or more modified geodetic coordinates to define three or more modified points delimiting the modified zone selection window in the first Cartesian projection space; and displaying by the processing device the modified zone selection window superimposed over the reference image.

According to one embodiment, the zone selection window is displayed having interactive corner regions allowing at least the size and position of the zone selection window to be modified.

According to one embodiment, the zone selection window is displayed having one or more interactive areas allowing the zone selection window to be rotated.

According to one embodiment, transforming, by the processing device, the image zone of the reference image delimited by the zone selection window to fill the final zone in the second Cartesian projection space comprises: loading one or more tiles forming the reference image having a zoom level selected based on a selected resolution of the georeferenced plan; and clipping the one or more tiles to the dimensions of the zone selection window.

According to one embodiment, transforming, by the processing device, the image zone of the reference image delimited by the zone selection window to fill the final zone in the second Cartesian projection space further comprises, before said clipping, rotating the one or more tiles based on a selected angle of rotation of the image selection window.

According to a further aspect, there is provided a computer-readable electronic storage medium storing instructions that cause, when executed by a processing device, the above method to be implemented.

According to a further aspect, there is provided a computing device for generating a georeferenced plan of a building or building complex, the computing device comprising: a memory device storing a georeferenced reference image of a map or aerial view of an area comprising the building or building complex, the reference image corresponding to a first Cartesian projection space; and a processing device configured to: convert first coordinates of three or more points defining a zone selection window in the reference image into three or more corresponding geodetic coordinates; convert the three or more geodetic coordinates into second coordinates of the three or more points in a second Cartesian projection space to define a final zone in the second Cartesian projection space; and generate the georeferenced plan by transforming the image zone of the reference image delimited by the zone selection window to fill the final zone in the second Cartesian projection space.

BRIEF DESCRIPTION OF THE DRAWINGS

The foregoing and other features and advantages will become apparent from the following detailed description of embodiments, given by way of illustration and not limitation with reference to the accompanying drawings, in which:

FIGS. 5A to 5E are flow diagrams illustrating, in more detail, operations of the method of georeferencing points on a plan of a building complex of FIG. 3 according to an example embodiment; and FIG. 6A represents image composition according to an example embodiment; and FIG. 6B represents reference image tiles according to an example embodiment.

DETAILED DESCRIPTION OF THE PRESENT EMBODIMENTS

Figure 1A:
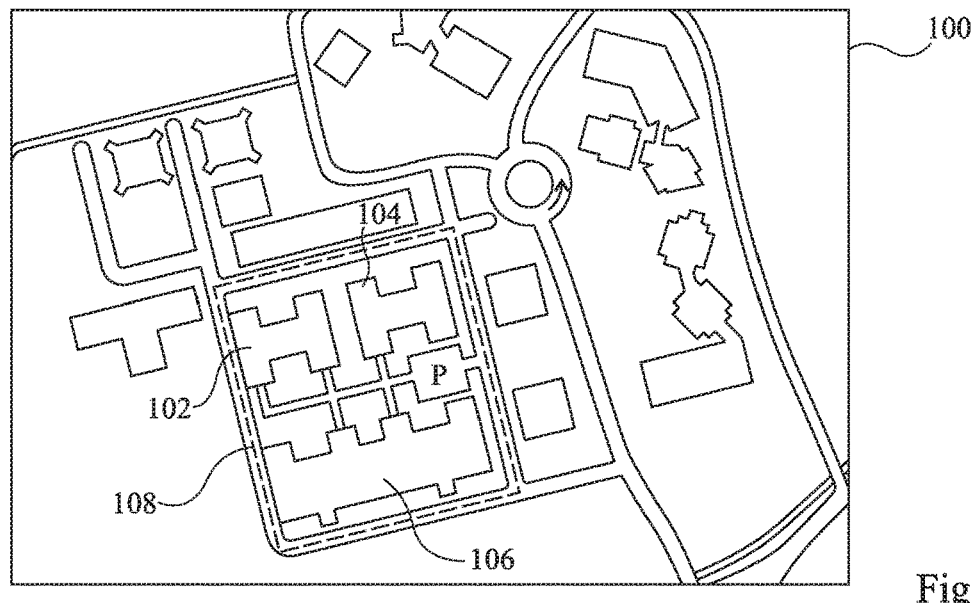
FIG. 1A illustrates a map of a geographical zone according to an example embodiment.

FIG. 1A schematically illustrates an example of a georeferenced reference image 100 representing an area of streets and buildings. Within the area represented by image 100, a zone 101 corresponds to a building complex formed of buildings 102, 104 and 106.

The georeferenced reference image 100 is for example a map, aerial view or satellite image, for example as widely available via the intend from services such as Google Maps and Bing Maps (the names "Google Maps" and "Bing Maps" are likely to correspond to registered trademarks). This reference image 100 will be referred to herein as being "georeferenced", because the geographical location represented by pixels of the image are known or can be calculated, permitting coordinates, such as GPS coordinates, to be plotted on the image. For example, the geographical location on the Earth's surface of one point in the image is known, and thus by knowing the distance represented by each pixel and the orientation of the area represented in the image, a pixel corresponding to another geographical location can be plotted in the image.

Images of the type represented in FIG. 1A are generally based on a 2-dimensional Cartesian coordinate system such as one based on the spherical Mercator projection, which is the case for the vast majority of public web map providers such as Google Maps, or a variant thereof. This spherical Mercator projection is sometimes also called a web Mercator projection.

It is for example desired to create a computing application capable of providing navigational assistance within the building complex 101. It is for example assumed that 2-dimensional or 3-dimensional plans of the buildings 102, 104 and 106 are available, an example of which will now be described with reference to FIG. 1B.

Figure 1B:
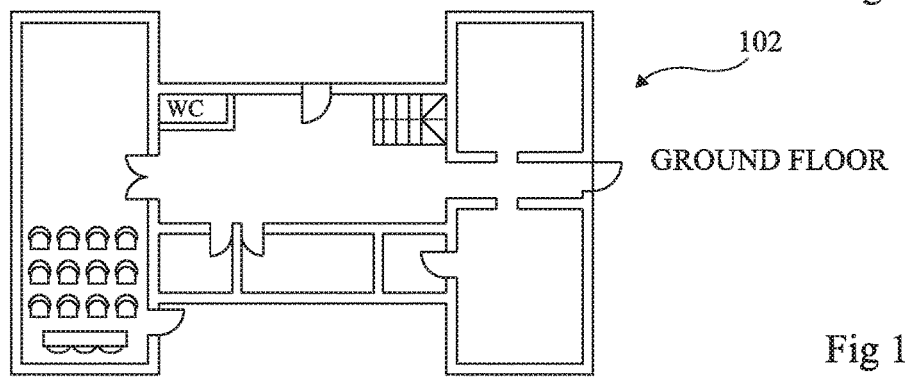
FIG. 1B is a plan representing a building complex of the geographical zone of FIG. 1 according to an example embodiment.

FIG. 1B is a floor plan illustrating an example of the ground floor (GROUND FLOOR) of the building 102 of the building complex 101 of FIG. 1A. This plan for example shows the positioning of walls, doorways, a stair case and a toilet (WC). Furthermore, other details may be indicated, such as seating areas, conference tables, etc.

The plan view of FIG. 1B is for example available in electronic form, and it is for example drawn to scale, meaning that the relative dimensions accurately reflect those of the actual building. Such plans for example use, or can be relatively easily adapted to use, a 2-dimensional Cartesian coordinate system such as the UTM (Universal Transverse Mercator) coordinate system. As known by those skilled in the art, the UTM coordinate system is composed of 60 zones around the world's surface, each zone being based on a particular projection that is well adapted to that zone. Thus UTM is able to provide a relatively accurate projection of the true surface of the Earth.

While the floor plan of FIG. 1B is a 2-dimensional plan, in alternative embodiments this plan could be a 3-dimensional plan that additionally shows other floors of the building 102.

In order to permit the 2-dimensional plan of FIG. 1B, and/or a 3-dimensional plan of such a building, to be used as part of a satellite or indoor navigation system for navigation within the building complex 101, the plan should be adapted such that a relatively precise location of some or all of the pixels of the plan can be calculated. Such a plan will be referred to herein as a georeferenced plan.

Figure 2:
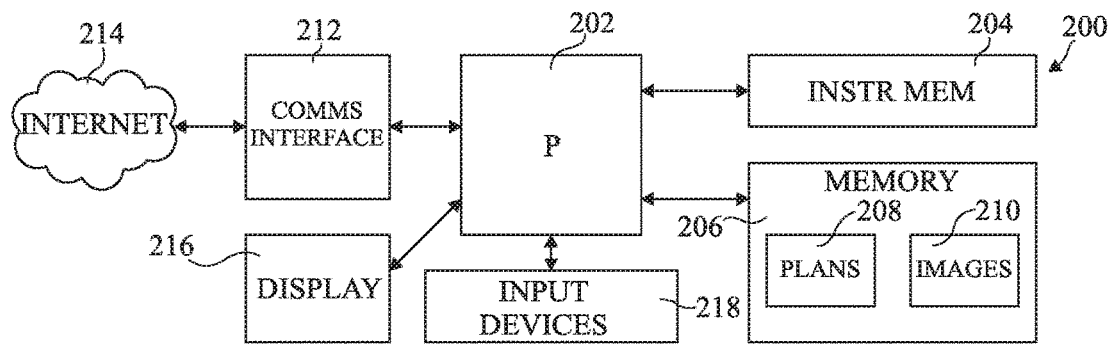
FIG. 2 schematically illustrates a computing device for generating a georeferenced plan of a building complex according to an example embodiment.

FIG. 2 schematically illustrates a computing device 200 for generating a georeferenced plan of a building or building complex. This computing device 200 is for example a PC (personal computer), laptop computer or other type of mobile computing device.

The device 200 for example comprises a processing device (P) 202 comprising one or more processors controlled by instructions stored in an instruction memory (INSTR MEM) 204. For example, the instruction memory 204 stores a computing application for generating a georeferenced plan.

The processing device 202 is also for example coupled to a memory (MEMORY) 206, which may form part of a same or separate memory device to the instruction memory 204, and which for example stores electronic images representing one or more plans (PLANS) 208 of buildings or building complexes, and one or more reference images (IMAGES) 210.

The processing device 202 is also for example coupled to one or more communications interfaces (COMMS INTERFACE) 212, such as network adapters and/or wirelesses receivers, which for example permit communications with the internet (INTERNET) 214 via one or more wired or wireless channels.

The computing device 200 also for example comprises user interface devices such as a display (DISPLAY) 216, which could be a touchscreen, and/or one or more input devices (INPUT DEVICES) 218, such as a keyboard and mouse.

Figure 3:
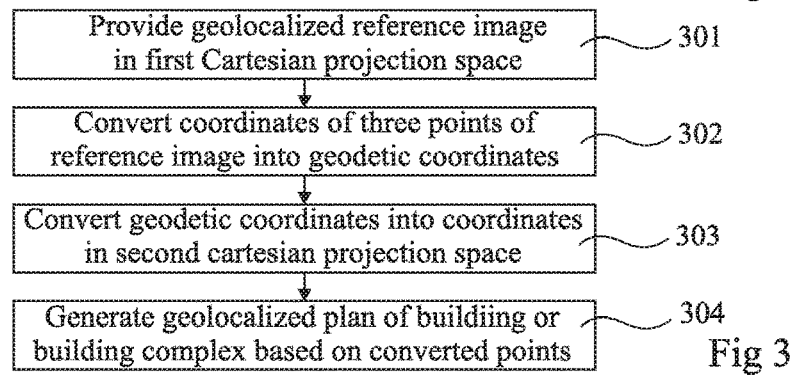
FIG. 3 is a flow diagram illustrating operations in a method of generating a georeferenced plan of a building complex according to an example embodiment.

FIG. 3 is a flow diagram illustrating an example of operations in a method of generating a georeferenced plan of a building or building complex. These operations are for example performed by execution of one or more computer programs stored in the instruction memory 204 of FIG. 2 and executed by the processing device 202.

In an operation 301, a georeferenced reference image in a first Cartesian projection space is provided, such as the image 100 of FIG. 1A. The georeferenced reference image is for example a map, an aerial view, such as an aerial photograph, or a satellite image, or an image formed of a combination of these elements. The first Cartesian projection space is for example the spherical Mercator projection space, although other projection spaces would be possible.

In an operation 302, the coordinates of three or more points of the reference image are converted by the device 202 into coordinates in a geodetic coordinate system. These points define an image region of the reference image corresponding to the zone for which it is desired to create the georeferenced plan, and in some embodiments this zone is a rectangular or square zone defined by its four corner points. As will be described in more detail below, at least some of the points are for example selected by a user using an interactive window overlying the georeferenced reference image. For example, in the case of a square zone, a user for example selects two corner points to define the zone, and the position of the other two corner points can be deduced by the processing device 202. In the case of a rectangular zone, a user for example selects three corner points of the zone, and the fourth point can be deduced by the processing device 202.

As known to those skilled in the art, a geodetic coordinate system is one that is based on an approximation of the Earth's surface as an ellipsoid, and the coordinates are expressed in latitude and longitude. For example, WGS84 (World Geodetic System, version agreed in 1984) is an example of a geodetic coordinate system, although other geodetic coordinate systems could be used.

For example, in the case that the reference image is a standard spherical Mercator projection, or a Web Mercator projection, coordinates of longitude λ and latitude φ in radians can be calculated for a given point based on the following formulas:

$$\lambda = \frac{x}{a} \quad (1)$$

$$\varphi = 2\tan^{-1}(e^{(\frac{y}{a})}) - \frac{\pi}{2} \quad (2)$$

where x is the Easting coordinate, y is the Northing coordinate, a is the ellipsoid semi-major axis, equal to 6378137 m in the case of WGS84, and e is the ellipsoid eccentricity, equal to 0.081819190842622 in the case of WGS84.

In an operation 303, the geodetic coordinates are converted to coordinates in a second Cartesian coordinate system. For example, the second Cartesian coordinate system is the one of the desired final projection space. The term "final projection space" will be used herein to designate the projection space of the building plan that is to be georeferenced. In some embodiments, the second Cartesian coordinate system is the UTM coordinate system. However, in alternative embodiments, other projection spaces could be used, such as the Swiss grid projection space, the Lambert II projection space, etc.

For example, in the case that the second Cartesian coordinate system is UTM, and the geodetic coordinates are WGS84, the conversion is for example performed based on formulas that can be found for example in the document titled "Converting UTM to Latitude and Longitude (or Vice Versa)", by Steven Dutch of the University of Wisconsin Green Bay, available at the following web address: http://www.uwgb.edu/dutchs/usefuldata/utmformulas.htm, the contents of which is hereby incorporated by reference to the extent permitted by the law. There are no inverse formulas providing a direct solution for calculating the latitude and longitude from the X and Y coordinates, and therefore the calculation is for example based on a Newton approximation method.

In an operation 304, a georeferenced plan of the building or building complex is generated based on the converted coordinates of the points in the reference image. For example, the four points in the reference image define an image zone which is extracted and transformed to fill a final zone in the second Cartesian projection space, the final zone being delimited by the converted coordinates.

The transformation of the selected zone of the georeferenced reference image into an image in the second Cartesian projection space for example results in a georeferenced plan. In some embodiments, this georeferenced plan may then be used to generate a georeferenced floor plan of a building or building complex, for example by overlaying the georeferenced plan with the floor plan, which is for example in the form of an architectural CAD (computer aided design) file, in other words by placing the content of this file over the georeferenced plan such that the floor plan becomes georeferenced.

Figure 4:
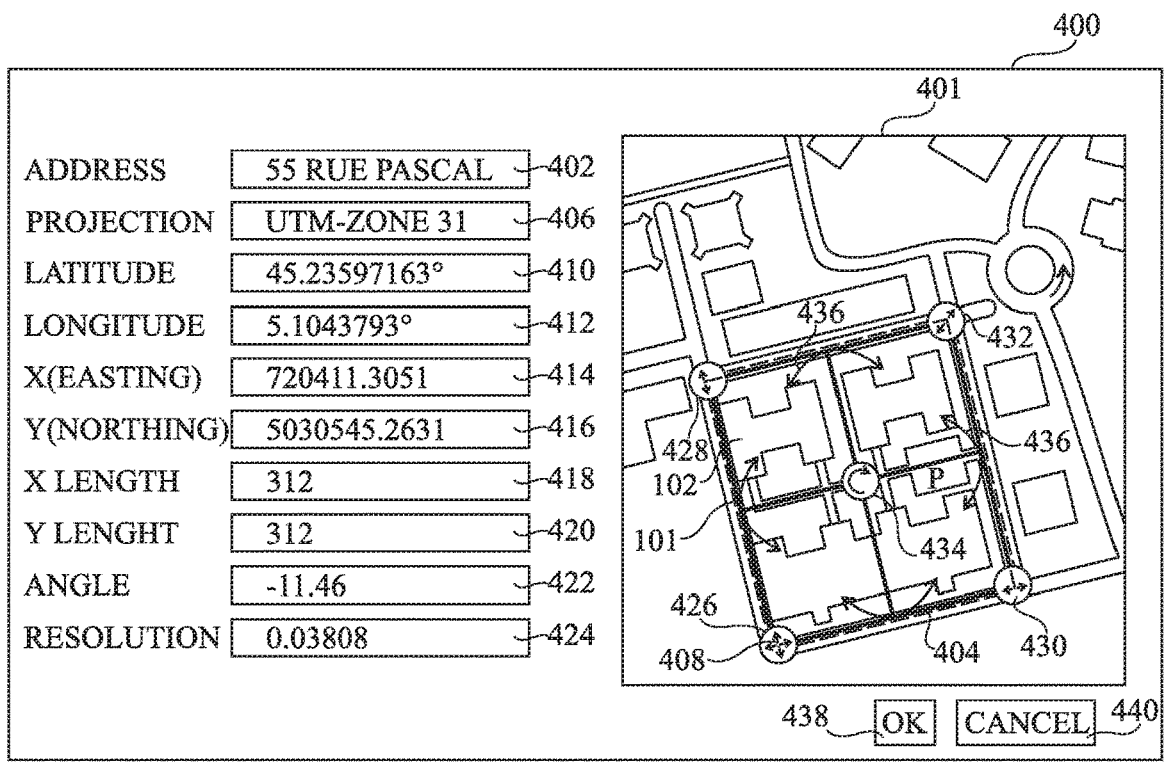
FIG. 4 is a view of a graphical user interface of the computing device of FIG. 2 according to an example embodiment.

FIG. 4 illustrates an example of a graphical user interface 400 of a computing application used to implement the method of FIG. 3.

On the right-hand side in FIG. 4, an area of a georeferenced reference image is reproduced within a display window 401. The image has for example been downloaded from the internet based on a street address (ADDRESS) entered by a user in a text input box 402.

A zone selection window 404 is for example superimposed over the reference image within the display window 401. The zone selection window 404 is for example a square in the final projection space, in other words the second Cartesian coordinate system of FIG. 3. However, in alternative embodiments, the zone selection window 404 could be of a different shape, such as rectangular. The Cartesian coordinate system of the final projection (PROJECTION) is for example indicated in a dialog box 406, and in the example of FIG. 4, the coordinate system is UTM, as indicated by the wording "UTM-zone 31". Other coordinate systems are also for example supported. The square of the zone selection window 404 is for example transformed into the coordinate system of the reference image before being superimposed over the image window 401. Thus the zone selection window 404 is for example distorted when displayed in the display window 401, and thus may no longer be perfectly square.

The location of the zone selection window 404 is for example defined by the location of a point 408 in the bottom left corner of the window 404. This point is for example defined in the WGS84 projection space by degrees of latitude (LATITUDE) indicated in a dialog box 410, and degrees of longitude (LONGITUDE) indicated in a dialog box 412. The coordinates of this point in the final projection space are for example defined in the graphical user interface 400 by a value X (FASTING) 414 and a value Y (NORTHING) 416. In the case of UTM, these coordinates are for example expressed in metres, and the coordinate system for example has an origin on Earth that depends on the UTM zone. In the example of FIG. 4, the coordinates are provided to four decimal places, corresponding to a precision of one tenth of a millimetre, although in alternative embodiments fewer decimal places could be used. The length of the upper and lower sides (X LENGTH) of the zone selection window 404 is for example defined in meters in a dialog box 418, and the length of the left-hand and right-hand sides (Y LENGTH) of the zone selection window 404 in the final projection space is for example defined in meters in a dialog box 420. Furthermore an angle of rotation (ANGLE) of the zone selection window 404 with respect to the vertically and horizontally aligned position of the window in the final projection space is indicated in a dialog box 422. A resolution dialog box 424 (RESOLUTION) for example indicates the resolution in the final projection space. In particular, this value for example indicates the real size, in metres, of each pixel of the image that is to be generated in the final projection space. This value is for example initially set at a default level, and may be modified by a user. For a given zone on the Earth, the lower the resolution, the bigger the final resulting image will be in terms of pixels.

The user is for example capable of selecting a zone in the reference image by positioning the zone selection window 404 over the desired zone. In the example of FIG. 4, it is assumed that the desired zone corresponds to the area 101 of FIG. 1A. For example, the zone selection window 404 has interactive regions, formed by a circle in each corner and a further circle positioned at the centre of local axes that are aligned with the sides of the zone selection window 404. A user can for example click and drag any of these interactive regions, for example by using a mouse cursor or by touching them on a touch screen, in order to apply certain modifications to the position, size and orientation of the window 404. For example:

- moving the region 426 in the bottom left-hand corner of the window 404 causes the whole window 404 to move, without altering its dimensions or orientation;
- moving the region 428 in the top left-hand corner of the window 404 for example alters the length of the left-hand and right-hand sides of the window 404, corresponding to the length in the Y-direction of the plan;
- moving the region 430 in the bottom right-hand corner of the window 404 for example alters the length of the upper and lower sides of the window 404, corresponding to the length in the X direction of the plan;
- moving the region 432 in the top right-hand corner of the window 404 for example enlarges the window 404 in both dimensions, but for example maintains the ratio between the X and Y lengths. In the present example, this ratio is for example fixed at 1:1, such that the window 404 is square, although in alternative embodiments the window 404 could be rectangular; and
- moving the region 434 at the centre of the local axes for example allows a centre of rotation of the zone selection window 404 to be defined, and by clicking on arrows 436 at the ends of each of the local axes, the zone selection window 404 can for example be rotated about this point. In the example of FIG. 4, one of the local axes is aligned with an edge of the building 102. In this way, the angle of rotation of the window 404 can be chosen such that the window 404 is aligned with a desired feature.

Of course, the interactive regions 426 to 436 in FIG. 4 provide merely some examples of mechanisms for permitting the dimensions and orientation of the image selection zone to be visually modified by a user with respect to a reference image. It would be possible to provide different mechanisms to allow the zone selection window 404 to be modified.

The user interface 400 also for example comprises an "OK" button 438, which can be selected by a user once the zone selection window has been positioned, sized and orientated in a desired manner. A cancel button (CANCEL) 440 is also for example provided allowing a user to cancel the operation and return to a main application.

The method of generating a georeferenced plan of a building or building complex will now be described in more detail with reference to FIGS. 5A to 5D.

Figure 5C:
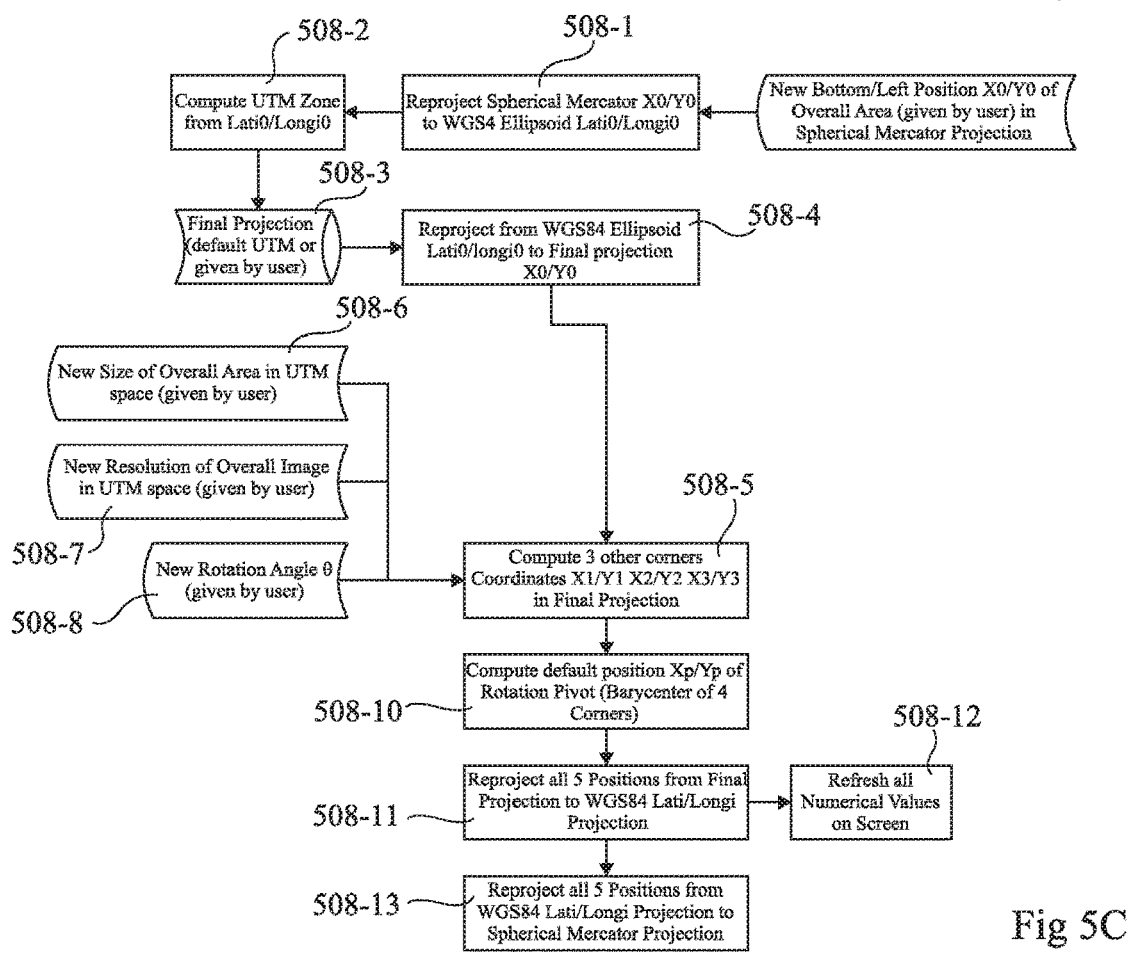
Figure 5A:
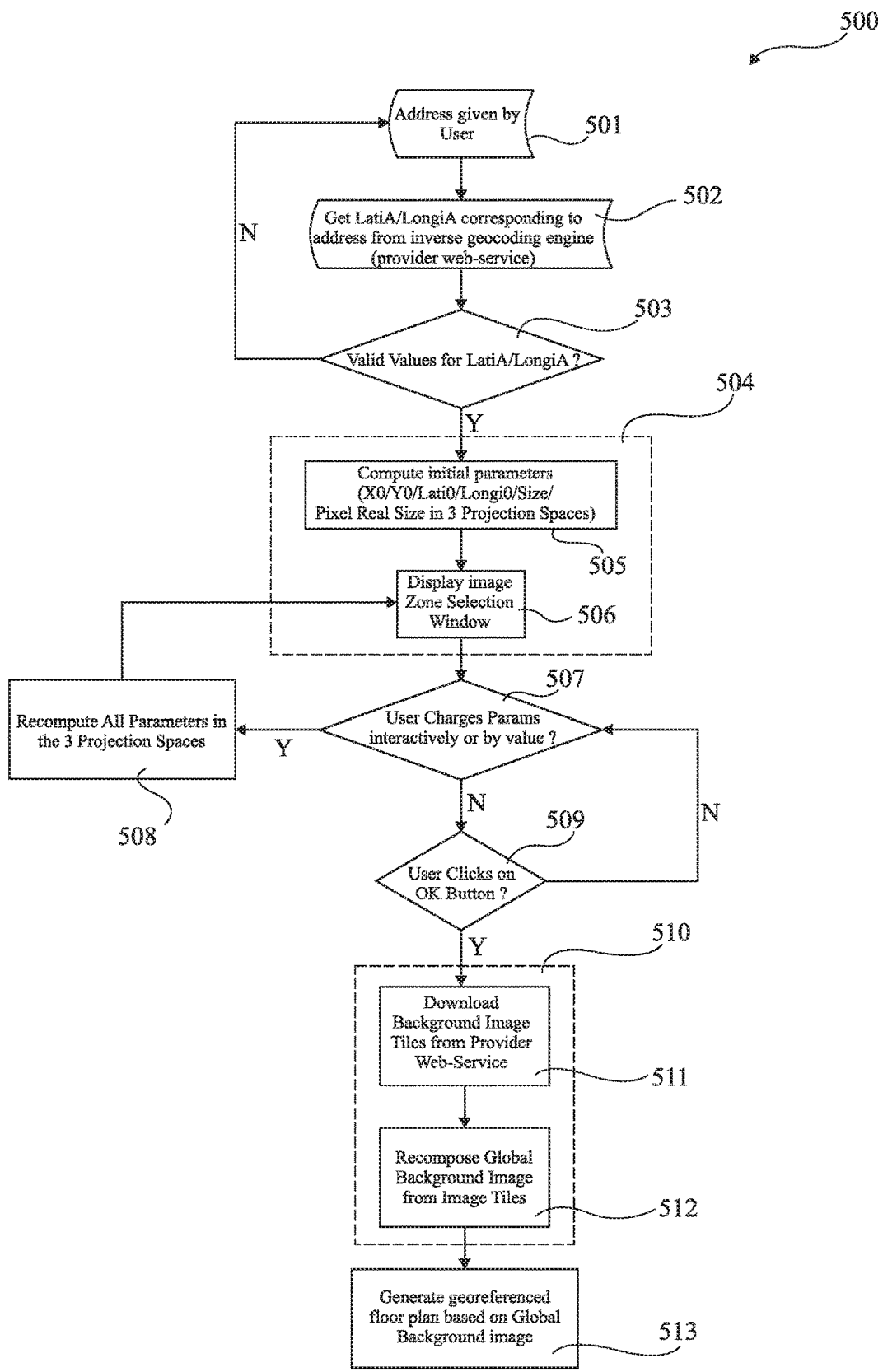

FIG. 5A is a flow diagram illustrating an overview of the operations of generating a georeferenced plan. These operations are for example performed by or in conjunction with a suitable computing application stored in the instruction memory 204 of the computing device 200 of FIG. 2. Furthermore, it will be assumed in the following description that the graphical user interface 400 of FIG. 4 is employed.

In an operation 501, an address is entered by a user, for example using the dialog box 402 of FIG. 4.

In an operation 502, an inverse geocoding engine, for example provided by a web-service, is used to fetch a latitude value LatiA, and a longitude value LongiA, associated with the address. Of course, rather than using such an address input method, the user may input the latitude and longitude values LatiA and LongiA directly.

In an operation 503, it is determined whether the values obtained or received for LatiA and LongiA are valid. For example, if the address is not known, or if there is more than one location associated with the given address, the returned values of LatiA and LongiA will not be valid. In such a case, the method for example returns to operation 501, and the user is prompted to modify the input address. If the values of LatiA and LongiA are valid, the next operation is 504.

In operation 504, a georeferenced reference image, such as a map and/or aerial or satellite image corresponding to the location values LatiA and LongiA is displayed. For example, this image is downloaded from a web map provider, or it may form part of an electronic map already stored by the computing device. The reference image is for example of an area centred on the location defined by the location values LatiA, LongiA. Furthermore, an initial zone selection window is also for example displayed superimposed over the reference image. This operation for example involves sub-operations 505 and 506.

In operation 505, initial parameters are for example computed in order to define an initial position, size and orientation of the zone selection window. These parameters for example include: geodetic coordinate values Lati0 and Longi0, which may be equal to the user defined values LatiA, LongiA, or could be computed as being equal to the geodetic coordinates of the bottom left-hand corner of a zone selection window of a default size centred on the location defined by LatiA, LongiA; the initial position of the window, defined for example as coordinates X0 and Y0 of the bottom left-hand corner as labelled 414 and 416 in FIG. 4, and which correspond to the Cartesian coordinates in the final projection space of the geodetic values Lati0 and Longi0; the size of the zone selection window, defined for example by the length in the X and Y directions; and the pixel real size in the initial and final Cartesian projection spaces, for example respectively the Spherical Mercator and UTM projection spaces.

In the operation 506, the initial zone selection window with interactive regions is displayed overlaying the reference image.

In an operation 507, it is determined whether or not any of the parameters defining the zone selection window 404 have been modified, either by a user making a modification using one of the interactive regions of the zone selection window, or by modifying the value in one of the dialog boxes on the left-hand side in FIG. 4. If so, in a subsequent operation 508, the parameters are recomputed in the three projection spaces, and then the method returns to operation 506 such that the new zone selection window is displayed. If no user changes are made to the parameters, the next operation is 509.

In operation 509, it is determined whether a user has clicked on the "OK" button 438 of the user interface 400. If not, the method returns to operation 507. Alternatively, if the user clicks on the "OK" button 438, the next operation is an operation 510.

The operation 510 for example comprises sub-operations 511 and 512. In the operation 511, background image tiles from the reference image displayed in the display window 401 and which are at least partially covered by, the zone selection window 404 are downloaded, for example from the web map provider. In operation 512, a global background image, in the final projection space, is for example generated by recomposing the downloaded image tiles and performing a transformation to change the projection space of the image to the final projection space. This background image is then rotated according to the selected rotation angle, which is for example a default value or a value chosen by a user using the dialog box 422 of FIG. 4.

The generated global background image thus forms a georeferenced plan. In some embodiments, a further georeferenced plan is generated in an operation 513. In particular, the global background image may be used to generate a georeferenced floor plan, as described above, for example by superposing the floor plan over the global background image, and aligning the two images, or replacing the global background image by the floor plan.

Figure 5B:
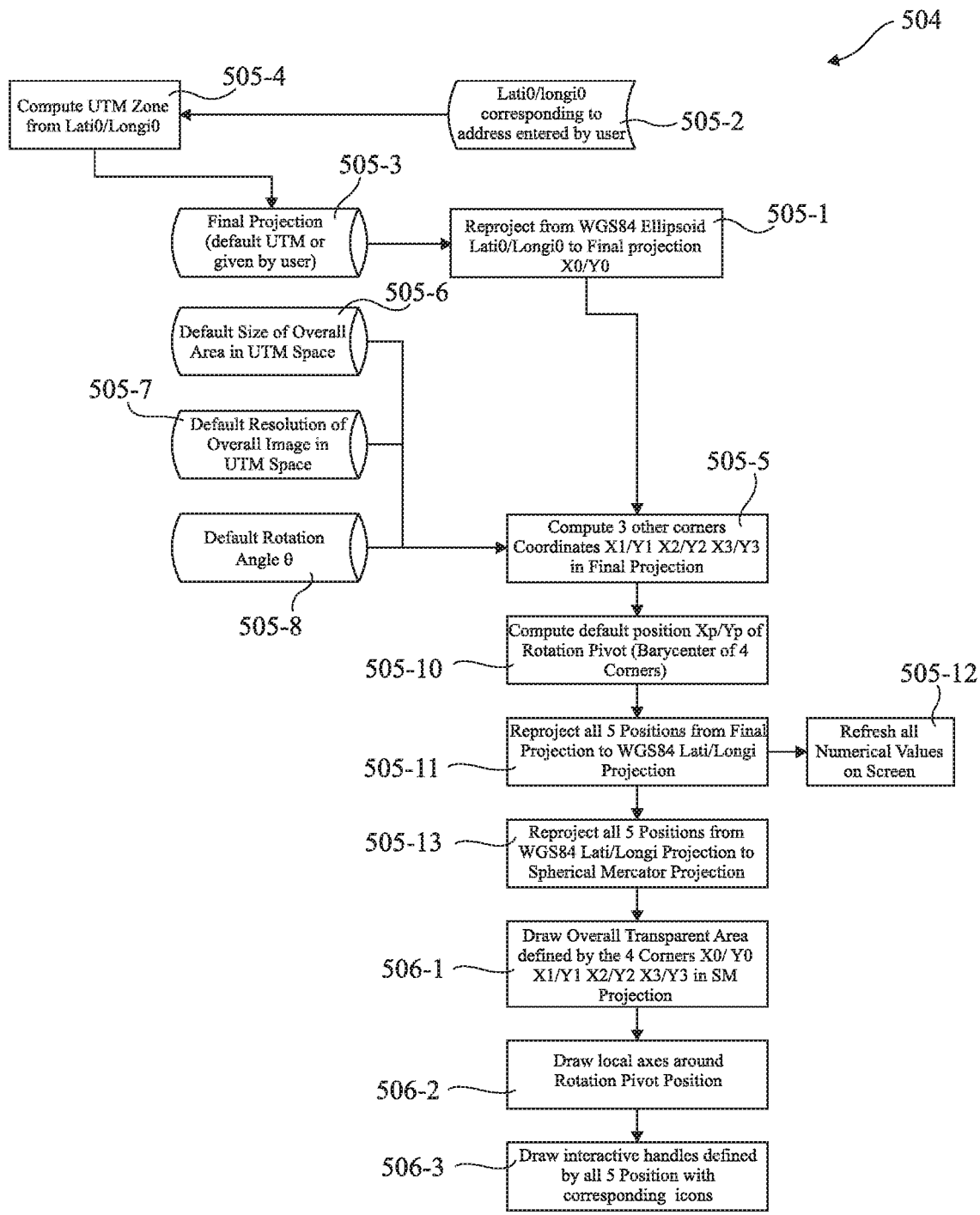

FIG. 5B illustrates operations implementing the operation 504 of FIG. 5A in more detail according to an example embodiment.

The operation 505 for example comprises sub-operations 505-1 to 505-13. In operation 505-1, the position Lati0, Longi0 is for example reprojected from the WGS84 Ellipsoid projection space to the final projection space, which is for example UTM. This operation for example takes as input parameters the latitude and longitude Lati0, Longi0 described in block 505-2, generated for example based on the address entered by the user, and an indication 505-3 of the final projection space. For example, the default final projection space is the UTM projection space, but a user may indicate another projection space that is to be used. In the case of a UTM projection, a UTM zone is for example computed from the latitude and longitude values in an operation 505-4, and provided as part of the UTM projection definition 505-3.

In operation 505-5, the three corner coordinates X1/Y1, X2/Y2 and X3/Y3 are for example computed in the final projection space, based on an input parameter 505-6 defining the default size of the overall area delimited by the window 404 in the UTM space, an input parameter 505-7 defining a default resolution of the overall image in the UTM space, and a parameter 505-8 defining a default rotation angle of the window 404. For example, the default rotation angle is 0 degrees, in other words the window 404 is aligned with the North, South, East and West directions of the reference image.

In operation 505-10, which is for example performed after operation 505-5, a default position Xp/Yp of the rotation pivot point 434 of the zone selection window 404 is for example computed as the barycentre of the four corners of the window 404.

In operation 505-11, the five positions corresponding to the four corners of the window 404 and the rotation pivot point are for example reprojected as latitude and longitude coordinates in the WGS84 projection space. Certain values in the dialog boxes of the user interface of FIG. 4 are then for example refreshed in operation 505-12.

In operation 505-13, the five positions are reprojected from the WGS84 projection space to the projection space of the reference image, which is for example the Spherical Mercator projection space using for example formulas (3) and (4) above.

The operation 506 of FIG. 5A for example involves sub-operations 506-1, 506-2 and 506-3.

In operation 506-1, the zone selection window 404, delimiting a transparent zone in the projection space of the reference image, is for example drawn superimposed over the reference image.

In operation 506-2, the local axes of the rotation pivot point are for example drawn.

In an operation 506-3, the five interactive regions of the zone selection window 404 are for example drawn, thereby completing the display of the zone selection window 404.

FIG. 5C is a flow diagram illustrating the operation 508 of FIG. 5A of computing parameters in the three projection spaces in more detail according to an example embodiment. The operation 508 for example comprises sub-operations 508-1 to 508-13.

In operation 508-1, the (X0,Y0) coordinates in the projection space of the reference image are reprojected as (Lati0, Longi0) coordinates in the WGS84 projection space, based for example on new values of X0 and Y0 corresponding to a new position defined by a user input in the operation 507 of FIG. 5A.

In operation 508-2, the UTM zone corresponding to the new coordinates Lati0 and Longi0 is for example determined, and in operation 508-3, the UTM zone is used to define the final projection space.

In operation 508-4, the new coordinates Lati0 and Longi0 are reprojected as coordinates (X0,Y0) in the final projection space.

The operations 508-5 to 508-13 are then performed for redefining the zone selection window based on any new input parameters indicated by the user. These operations 508-5 to 508-13 are for example the same as the operations 505-5 to 505-13 respectively of FIG. 5B described above, and will not be described again in detail. However, the parameters 508-6, 508-7 and 508-8 are either the default ones, or new ones given by a user in the case that they have been modified.

FIG. 5D is a flow diagram illustrating operations of the operation 510 of FIG. 5A for generating the transformed background image from the selected zone of the reference image.

In an operation 511-1, a global axes-aligned rectangle is calculated in the reference image projection space, the global rectangle being calculated to include each of the four corners of the zone selection window 404. This rectangle is for example defined based on minimum and maximum X and Y coordinates in the reference image projection space, as will now be described with reference to FIG. 6A.

FIG. 6A illustrates the zone selection window 404 in the reference image projection space according to an example embodiment. It can be seen that, in this space, the zone selection window is not perfectly rectangular, due to the differences between the final projection space and the projection space of the reference image. The four corners of the window 404 are at coordinates (X0,Y0), (X1,Y1), (X2,Y2) and (X3,Y3) in the reference image projection space. The minimum X coordinate Xmin is for example defined as the minimum of the X coordinates, in other words by the function min(X0,X1,X2,X3), and in the example of FIG. 6A, X0 is the minimum value. The maximum X coordinate Xmax is for example defined as the maximum of the X coordinates, in other words by the function max(X0,X1,X2, X3), and in the example of FIG. 6A, X3 is the maximum value. Similarly, the minimum Y coordinate Ymin is for example defined as the minimum of the Y coordinates, in other words by the function min(Y0,Y1,Y2,Y3), and in the example of FIG. 6A, Y1 is the minimum value. The maximum Y coordinate Ymax is for example defined as the maximum of the Y coordinates, in other words by the function max(Y0,Y1,Y2,Y3), and in the example of FIG. 6A, Y2 is the maximum value. The global axes-aligned rectangle computed in operation 511-1 for example corresponds to the rectangle defined by the values of Xmin, Xmax, Ymin and Ymax, in other words the rectangle having the corners (X0,Y1), (X0,Y2), (X3,Y2) and (X3,Y1) in the example of FIG. 6A.

Referring again to FIG. 5D, in an operation 511-2, the tiles of the reference image covered at least partially by the global axes-aligned rectangle are computed. With reference to FIG. 6A, the reference image for example comprises tiles $T_{0,0}$ to $T_{5,3}$. The tiles from $T_{imin,jmin}$ to $T_{imax,jmax}$ are for example selected, where in the example of FIG. 6A imin is equal to 1, jmin is equal to 0, imax is equal to 4, and jmax is equal to 3. Thus the tiles $T_{1,0}$ to $T_{4,3}$ are for example determined as being at least partially covered by the global axes-aligned rectangle. The values of imin, imax and jmin, jmax are for example computed in an operation 511-1.

Operation 511 3 for example involves computing a zoom level of the reference images available from the web-service. For example, this operation is based on the four corners (X0,Y0), (X1,Y1), (X2,Y2) and (X3,Y3) in the reference image projection space, as indicated by box 511 4. While the reference image displayed in the display window 401 of the user interface may have a certain resolution, in other words a certain level of zoom, adapted to the area that is to be displayed, further images with different zoom levels are generally available from the web-server, as will now be described with reference to FIG. 6B.

FIG. 6B illustrates an example of zoom levels available for a given aerial image 600. In a top level, with no zoom, the image 600 for example has a given image size. As represented by a dashed square 602, at a first zoom level, each quadrant of the image 600 is for example represented by a corresponding image of the same image size as the image 600. Thus each pixel has twice the resolution, in other words its real size on Earth is half as wide in each direction, and thus has a quarter of the area, whereas the size in pixels (width and height) of this image does not change and is the same as the size of the image 600. As represented by a further rectangle 604, at the next zoom level, each quadrant of the image 602 is for example represented by a corresponding image of the same image size as the image 600, but each pixel has a resolution four times higher in the image 604 compared to the image 600. There may be further zoom levels, not indicated in FIG. 6B.

Returning again to FIG. 5D, the zoom level is for example chosen based on the desired resolution of the image in the final projection. In one embodiment, the zoom level is progressively increased, thereby increasing the resolution of the image tiles, until a desired minimum resolution in the final projection space has been achieved or exceeded. The minimum resolution is for example based on the desired pixel size of the image in the final projection, which is for example based on parameter 424 of FIG. 4.

After operation 511-2, the next operation is for example an operation 511-5, in which all image tiles at the appropriate zoom level Z are downloaded from the map provider's web-service. In particular, tiles $T_{i,j}$ are downloaded, with i from imin to imax, and j from jmin to jmax.

The operation 512 of FIG. 5A of recomposing a global background image from the image tiles for example involves sub-operations 512-1 to 512-3 shown in FIG. 5D.

In operation 512-1, a global image in the reference image projection space is for example composed by grouping the tiles downloaded in operation 511-5.

In operation 512-2, the four corner positions of the zone selection window are for example calculated in the final projection space.

In operation 512-3, the global background image is for example generated using a bilinear interpolation to transform the pixels within the zone selection window into the corresponding rectangular space in the final projection space and using a rotation transformation based on an angle of rotation, which is for example the one defined in dialog box 422 of FIG. 4, and which may have been defined by a user. A bilinear interpolation is just one example of a relative fast and effective technique for transforming the pixels within the zone selection window into the corresponding rectangular space in the final projection space. Other techniques could be used.

Generating the global background image for example involves clipping, rotating and resampling the global background image in the final projection space as will now be described in more detail with reference to FIG. 5E.

FIG. 5E is a flow diagram illustrating operations for clipping, rotating and resampling the global background image in the final projection space according to an example embodiment.

In an operation 512-11, the image is rotated, based on a rotation angle θ obtained from operation 512-12. This rotation angle θ is for example a default value or a value given by the user in the dialog box 422.

In operation 512-13, which may be performed at least partially in parallel with the operation 512-11, the corner positions 512-14 of the zone selection window are transformed to the final projection space.

In an operation 512-15, the rotated global image generated in operation 512-11 is clipped to the area defined by the local corner coordinates generated in operation 512-13.

In an operation 512-16, the clipped image is resampled based on the new pixel size in the final projection space, which for example corresponds to a default value or user defined value in the dialog box 424 of FIG. 4.

An advantage of the method described herein is that a georeferenced image can be generated in a final projection space corresponding to the projection space of a plan of a building or building or building complex. Thus points in the plan of the building complex can equally be georeferenced. A further advantage is that, by providing a zone selection window having interactive regions, the zone of the reference image to be selected and transformed to the final projection space can be modified in a simple fashion. Advantageously, this zone selection window has a square or rectangular form in the final projection space, and it is reprojected to the reference image projection space before being displayed, such that a zone can be selected with relatively high precision.

Having thus described at least one illustrative embodiment, various alterations, modifications and improvements will readily occur to those skilled in the art. For example, while example have been described based on a particular Cartesian coordinate system for a reference image and a particular Cartesian coordinate system for the image in the final projection space, other Cartesian coordinate systems could be used.

What is claimed is:

1. A method of generating a georeferenced plan of a building or building complex, the method comprising:
   providing a georeferenced reference image of a map or aerial view of an area comprising the building or building complex (102), the reference image corresponding to a first Cartesian projection space;
   converting, by a processing device, first coordinates of three or more points defining a zone selection window in the reference image into three or more corresponding geodetic coordinates;
   converting, by the processing device, the three or more geodetic coordinates into second coordinates of the three or more points in a second Cartesian projection space to define a final zone in the second Cartesian projection space; and
   generating the georeferenced plan by transforming, by the processing device, an image zone of the reference image delimited by the zone selection window to fill the final zone in the second Cartesian projection space.

2. The method of claim 1, further comprising generating a further georeferenced plan by combining with or replacing some or part of said final zone in the second Cartesian projection space with a plan of said building or building complex.

3. The method of claim 1, further comprising, prior to converting the first coordinates, displaying by the processing device an initial zone selection window superimposed over the reference image, and receiving a user input defining a modification to one or more of the size and angle of rotation of the initial zone selection window in order to generate said zone selection window.

4. The method of claim 3, wherein displaying the initial zone selection window comprises:
   defining coordinates of three or more initial points in the second Cartesian projection space defining the final zone;
   converting, by the processing device, the three or more initial points into three or more initial geodetic coordinates; and
   converting, by the processing device, the three or more initial geodetic coordinates to define three or more initial points delimiting the initial zone selection window in the first Cartesian projection space.

5. The method of claim 4, further comprising:
   receiving, via an input interface of the processing device, a modification of one or more of the size and angle of rotation of the initial zone selection window;
   calculating, based on said modification, three or more modified points in the second Cartesian projection space defining a modified final zone;
   converting, by the processing device, the three or more modified points into three or more modified geodetic coordinates;
   converting, by the processing device, the three or more modified geodetic coordinates to define three or more modified points delimiting the modified zone selection window in the first Cartesian projection space; and
   displaying by the processing device the modified zone selection window superimposed over the reference image.

6. The method of claim 3, wherein the zone selection window is displayed having interactive corner regions allowing at least the size and position of the zone selection window to be modified.

7. The method of claim 3, wherein the zone selection window is displayed having one or more interactive areas allowing the zone selection window to be rotated.

8. The method of claim 1, wherein transforming, by the processing device, the image zone of the reference image delimited by the zone selection window to fill the final zone in the second Cartesian projection space comprises:
   loading one or more tiles forming the reference image having a zoom level selected based on a selected resolution of the georeferenced plan; and
   clipping the one or more tiles to the dimensions of the zone selection window.

9. The method of claim 8, wherein transforming, by the processing device, the image zone of the reference image delimited by the zone selection window to fill the final zone in the second Cartesian projection space further comprises, before said clipping, rotating the one or more tiles based on a selected angle of rotation of the image selection window.

10. A computer-readable electronic storage medium storing instructions that cause, when executed by a processing device, the method of claim 1 to be implemented.

11. A computing device for generating a georeferenced plan of a building or building complex, the computing device comprising:
   a memory device storing a georeferenced reference image of a map or aerial view of an area comprising the building or building complex, the reference image corresponding to a first Cartesian projection space; and
   a processing device configured to:
   convert first coordinates of three or more points defining a zone selection window in the reference image into three or more corresponding geodetic coordinates;
   convert the three or more geodetic coordinates into second coordinates of the three or more points in a second Cartesian projection space to define a final zone in the second Cartesian projection space; and
   generate the georeferenced plan by transforming an image zone of the reference image delimited by the zone selection window to fill the final zone in the second Cartesian projection space.

* * * * *